US010736022B2

(12) United States Patent
Liu et al.

(10) Patent No.: US 10,736,022 B2
(45) Date of Patent: Aug. 4, 2020

(54) PROXY ASSISTED NAN AND ACCESS POINT CONCURRENT OPERATION (71) Applicant: Apple Inc., Cupertino, CA (US)

(72) Inventors: Yong Liu, Campbell, CA (US); Christiaan A. Hartman, San Jose, CA (US); Guoqing Li, Cupertino, CA (US); Su Khiong Yong, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/289,481

(22) Filed: Oct. 10, 2016

(65) Prior Publication Data
US 2017/0127344 A1 May 4, 2017

Related U.S. Application Data (60) Provisional application No. 62/249,877, filed on Nov. 2, 2015.

(51) Int. Cl.
*H04W 76/00* (2018.01)
*H04W 48/16* (2009.01)
*H04W 8/00* (2009.01)
*H04W 76/14* (2018.01)
H04W 84/12 (2009.01)
H04W 88/04 (2009.01)
H04W 84/18 (2009.01)

(52) U.S. Cl.
CPC ........... *H04W 48/16* (2013.01); *H04W 8/005* (2013.01); *H04W 76/14* (2018.02); *H04W* 84/12 (2013.01); H04W 84/18 (2013.01); H04W 88/04 (2013.01)

(58) Field of Classification Search
CPC ..... H04W 48/06; H04W 48/08; H04W 48/16; H04W 48/17; H04W 76/02; H04W 48/00; H04W 56/00; H04W 8/00; H04B 1/00; H04B 17/309; H04B 7/155
See application file for complete search history.

(56) References Cited

U.S. PATENT DOCUMENTS

| 9,585,144 | B1* | 2/2017 | Shaw ............... H04W 76/15 |
| 10,136,466 | B2* | 11/2018 | Martin ............. H04W 36/0016 |
| 2015/0081840 | A1 | 3/2015 | Patil et al. |
| 2015/0296457 | A1* | 10/2015 | Balasubramanian ............ H04W 52/0225 370/311 |

(Continued)

*Primary Examiner* — Khawar Iqbal
(74) *Attorney, Agent, or Firm* — Kowert, Hood, Munyon, Rankin & Goetzel, P.C.

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for peer NAN devices to assist one another in receiving communications from an access point common to the peer NAN devices. In some embodiments, a wireless station may establish a communication link with a Wi-Fi access point and establish a peer-to-peer communication link with one or more neighboring wireless stations. In addition, the wireless station may receive transmissions intended for at least one neighboring wireless station of the one or more neighboring wireless stations from the Wi-Fi access point and relay the transmissions to the at least one wireless station on behalf of the Wi-Fi access point.

20 Claims, 8 Drawing Sheets (56) References Cited

U.S. PATENT DOCUMENTS

| | | | |
|---|---|---|---|
| 2016/0014669 A1* | 1/2016 | Patil | H04W 40/246 |
| | | | 370/329 |
| 2016/0073330 A1 | 3/2016 | Patil et al. | |
| 2016/0204951 A1 | 7/2016 | Walton et al. | |
| 2016/0316391 A1* | 10/2016 | Calcev | H04W 52/0212 |
| 2016/0352842 A1* | 12/2016 | Patil | H04L 67/16 |
| 2016/0373957 A1* | 12/2016 | Larmo | H04W 52/0216 |
| 2017/0026901 A1* | 1/2017 | Patil | H04W 48/16 |
| 2017/0034769 A1* | 2/2017 | Kim | H04W 48/08 |
| 2017/0071022 A1* | 3/2017 | Sampath | H04W 52/0229 |
| 2017/0181088 A1* | 6/2017 | Kim | H04W 52/0229 |
| 2017/0238253 A1* | 8/2017 | Kim | H04W 52/0206 |
| | | | 455/574 |
| 2017/0374609 A1* | 12/2017 | Yang | H04W 52/0216 |
| 2018/0048574 A1* | 2/2018 | Merlin | H04L 47/12 |
| 2018/0049123 A1* | 2/2018 | Park | H04W 76/28 |
| 2018/0103423 A1* | 4/2018 | Popiel | H04W 76/15 |
| 2019/0199815 A1* | 6/2019 | Park | H04W 88/18 |
| 2019/0304292 A1* | 10/2019 | Merjanian | G08B 25/016 |

* cited by examiner

PROXY ASSISTED NAN AND ACCESS POINT CONCURRENT OPERATION

PRIORITY DATA

This application claims benefit of priority to U.S. Provisional Application Ser. No. 62/249,877, titled "Proxy Assisted NAN and Access Point Concurrent Operation", filed Nov. 2, 2015, by Yong Liu, Christiaan A. Hartman, Guoqing Li, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and method for peer devices to assist one another in receiving communications from an access point common to the peer devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to assist one another in receiving communications from an access point common to the peer devices. In some embodiments, a wireless station may establish a communication link with a Wi-Fi access point and establish a peer-to-peer communication link with one or more neighboring wireless stations. In addition, the wireless station may receive transmissions intended for at least one neighboring wireless station of the one or more neighboring wireless stations from the Wi-Fi access point and relay the transmissions to the at least one wireless station on behalf of the Wi-Fi access point.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

TERMINOLOGY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Figure 1:
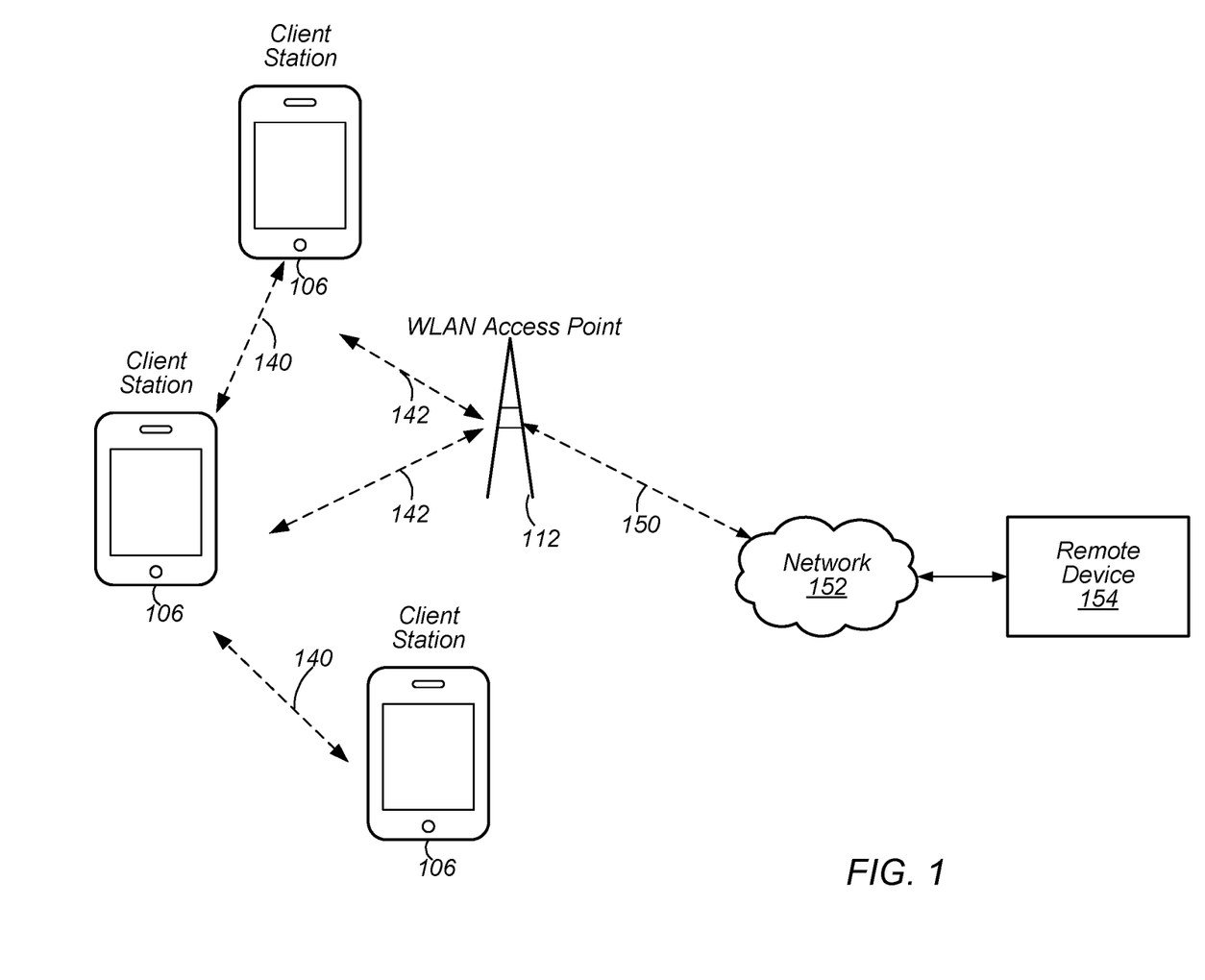
FIG. 1 illustrates an example WLAN communication system, according to some embodiments.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to establish communication links with an access point (e.g., AP 112) and one or more neighboring wireless devices (e.g., wireless devices 106), receive transmissions intended for at least one neighboring wireless station of the one or more neighboring wireless stations from the access point, and relay the transmissions to the at least one wireless station on behalf of the Wi-Fi access point.

Figure 2:
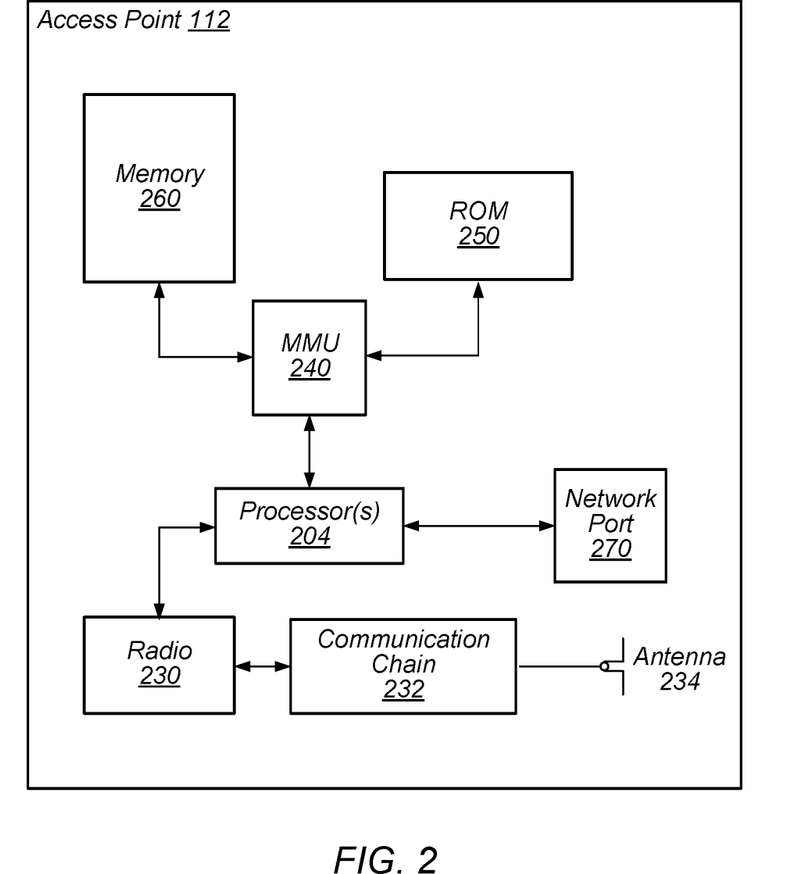
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to receive an indication from a wireless station (e.g., wireless station 106) that the wireless station is a proxy server for one or more neighboring wireless stations to which the proxy server has established peer-to-peer communication links and transmit an indication to the proxy server that the AP 112 has pending data for one of the one or more neighboring wireless stations.

Figure 3:
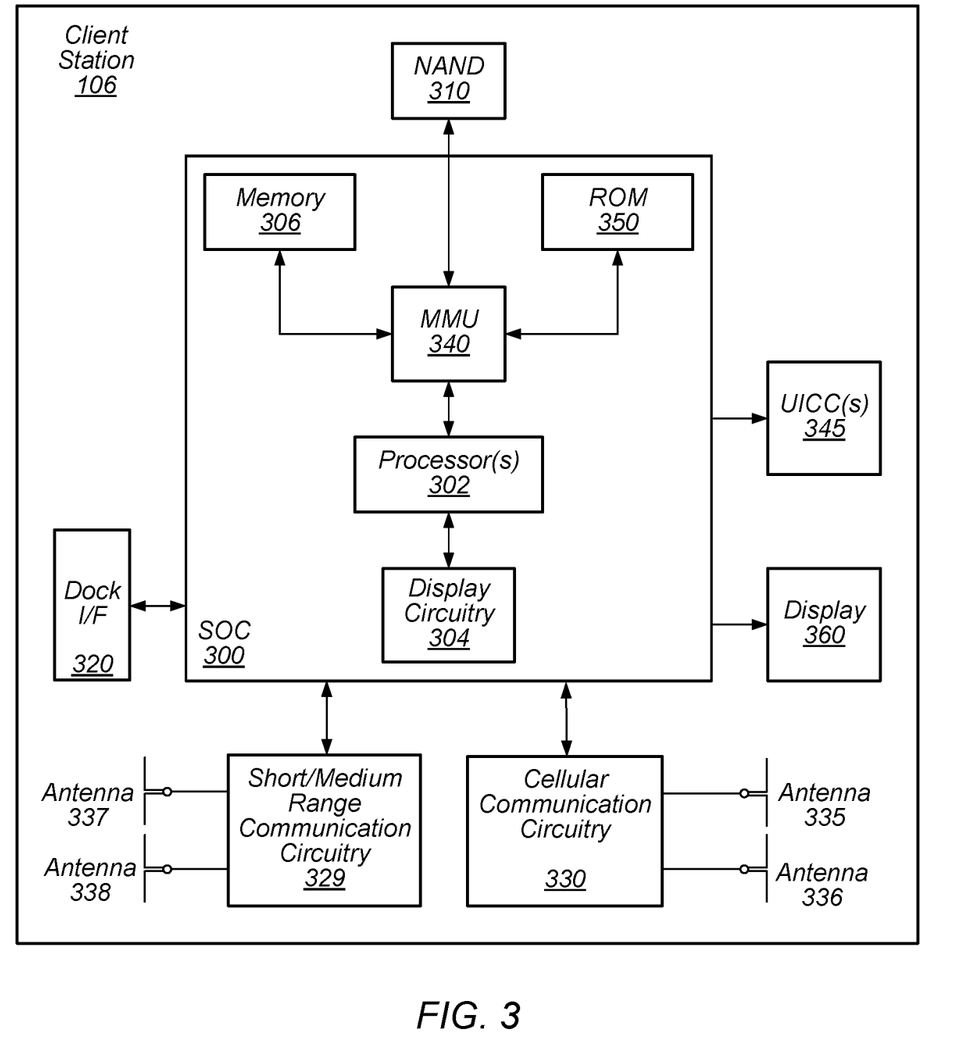
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to establish communication links with an access point (e.g., AP 112) and one or more neighboring wireless stations (e.g., wireless stations 106), receive transmissions intended for at least one neighboring wireless station of the one or more neighboring wireless stations from the access point, and relay the transmissions to the at least one wireless station on behalf of the Wi-Fi access point. The communication links with the one or more neighboring wireless stations may be peer-to-peer communication links and may be established according to the NAN protocol.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition)

the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for a NAN device to communicate with an access point with assistance from a proxy NAN device.

Access Point Communication

Figure 4A:
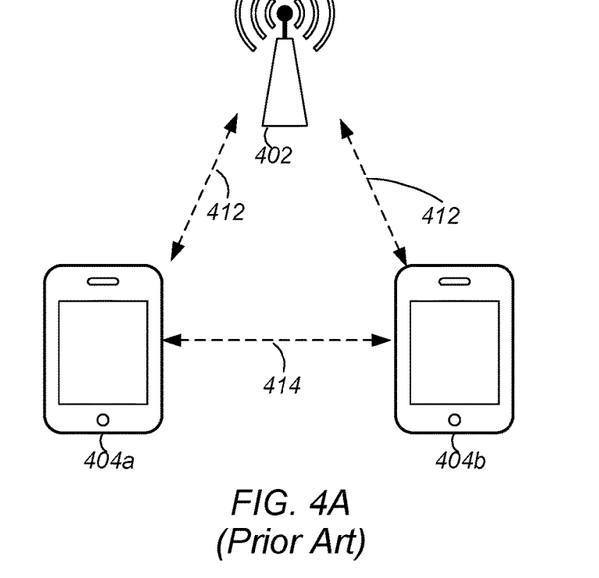
FIGS. 4A-4B illustrate communication between an access point and peer devices, according to existing implementations.
Figure 4B:
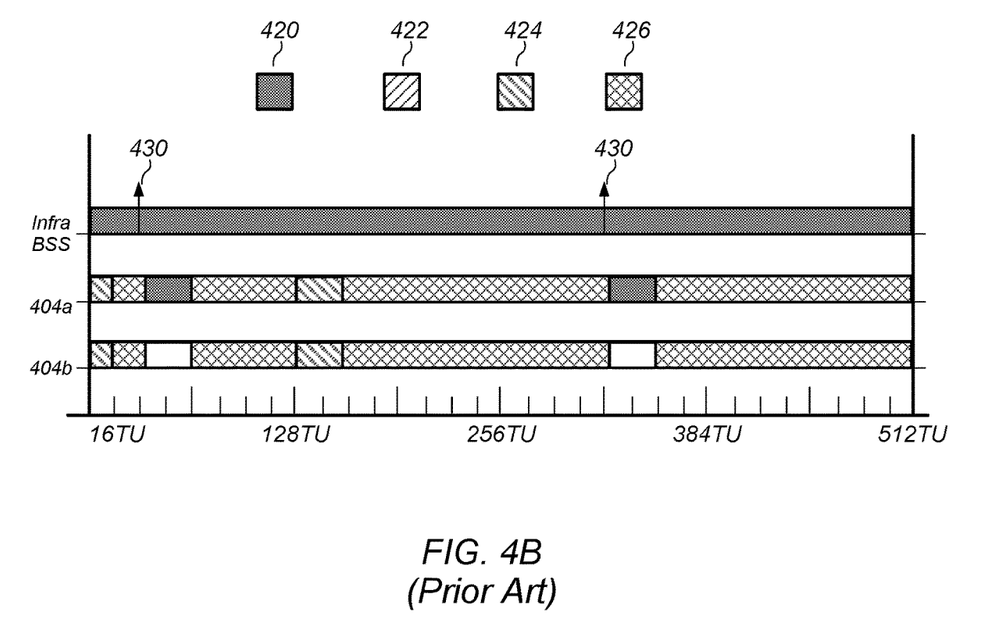

In some existing implementations, a NAN device may communicate with a peer NAN device and an access point. In addition, the peer NAN device may also communicate with the access point. FIGS. 4A-4B illustrate communication between an access point and peer devices, according to existing implementations. FIG. 4A illustrates an access point 402 in communication with peer devices 404a and 404b via data transmissions 412. Peer devices 404a and 404b may also be in communication via transmissions 414. FIG. 4B illustrates example schedules for infra BSS communications on an infra BSS channel(s), peer device 404a, and peer device 404b, according to existing implementations. As illustrated, peer device 404a may have a schedule that includes NAN discovery windows (e.g., time blocks 422) and NAN data cluster windows (e.g., time blocks 424) on NAN social channels as well as NAN data communications (e.g., time blocks 426) on NAN data channels and infra BSS communications (e.g., time blocks 420) on an infra BSS channel(s). Further, peer device 404b may have a schedule that includes NAN discovery windows (e.g., time blocks 422) and NAN data cluster windows (e.g., time blocks 424) on NAN social channels as well as NAN data communications (e.g., time blocks 426) on NAN data channels.

As illustrated by FIG. 4B, an access point can transmit both normal Wi-Fi beacons and delivery traffic indication map (DTIM) beacons periodically (e.g., beacons 430) on an infra BSS channel (e.g., time blocks 420 in FIG. 4B). Wi-Fi beacons are generally transmitted more often than DTIM beacons on the infra BSS channel. For example, in some implementations, Wi-Fi beacons are transmitted every 100 ms and DTIM beacons are transmitted every 300 ms. In addition, the DTIM beacon may be followed by broadcast and/or multicast transmissions, if any. In addition, in at least some implementations, a Wi-Fi device, e.g., device 404a, in a power-saving mode may wake up before DTIM beacons, e.g., before every DTIM beacon, to check whether there are any pending multicast and/or unicast frames from the access point.

Further, if the Wi-Fi device is NAN capable (i.e., is a NAN device) and associated with a NAN cluster (i.e., one or more NAN devices linked via NAN data links), the Wi-Fi device may also wake up before NAN discovery windows, which typically occur once every 512 time units (TU), where 1 TU is 1.024 ms. In other words, a NAN discovery window typically occurs once every 524.288 ms.

Thus, NAN cluster clock and/or schedules, based on NAN discovery windows, may not align well with an access point clock and/or schedules. Hence, a NAN device communicating with both an access point and peer devices within a NAN cluster may have difficulty scheduling concurrent operations with both the access point and peer devices (i.e., NAN datapaths).

Proxy Assisted NAN and Access Point Communication

Figure 5A:
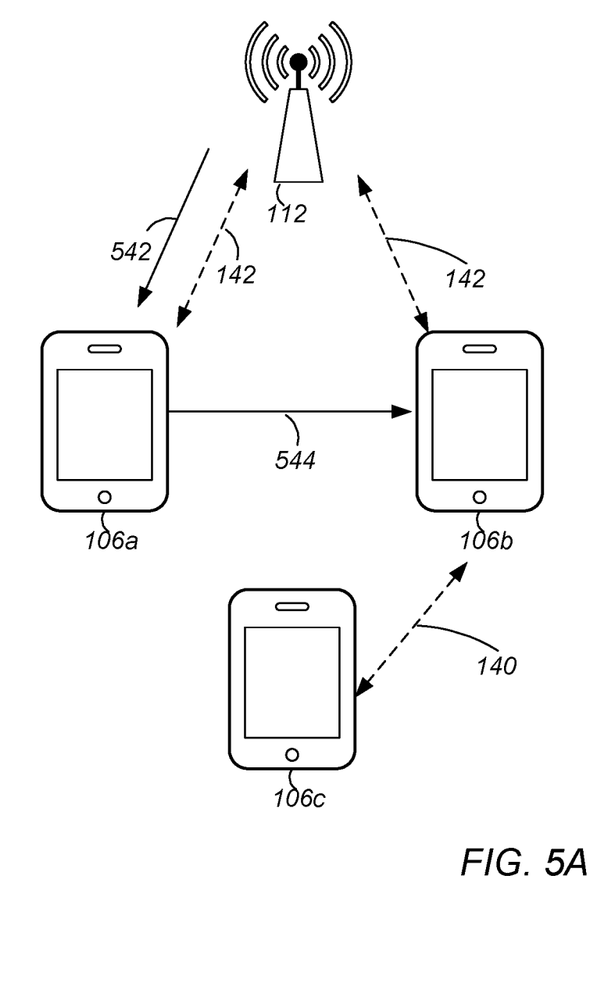
FIGS. 5A and 5B illustrate an example of a proxy assisted peer-to-peer communications, according to some embodiments.
Figure 5B:
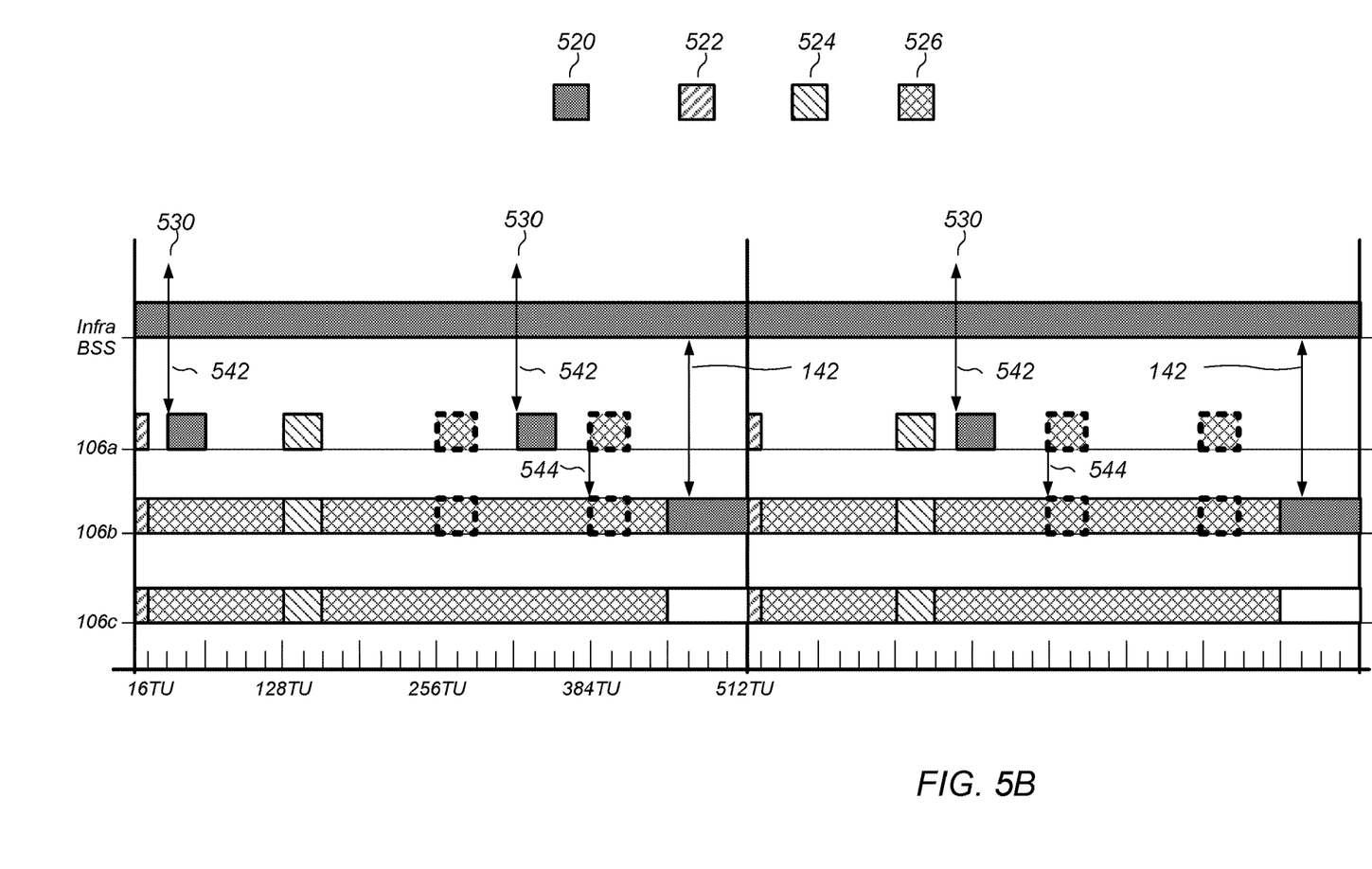

FIGS. 5A and 5B illustrate an example of a proxy assisted peer-to-peer communications, according to some embodiments. As illustrated in FIG. 5A, a NAN device (e.g., wireless station 106a) that communicates with both an access point (e.g., access point 112) and with one or more peer NAN devices (e.g., wireless station 106b) within a NAN cluster may serve as a proxy server between the access point and one or more other NAN devices (or proxy clients) (e.g., wireless stations 106b and 106c) within the NAN cluster. According to at least some embodiments, the proxy server (e.g., wireless station 106a) may periodically check beacons (e.g., beacons 542) from the access point and collect pending traffic indications (TIM) and beacon update indications (e.g., via a check beacon field) from the beacons intended for the proxy server's proxy clients (e.g., wireless stations 106b and 106c). Additionally, the proxy server may relay the pending traffic indications and beacon update indications (e.g., messages 544) to the proxy clients during some NAN data communication slots (e.g., via a schedule negotiated between the proxy server and the proxy clients). In addition, when a proxy client determines (e.g., via NAN data communications with the proxy server) that the access point has pending transmissions and/or beacon updates for the proxy client, the proxy client may schedule a period to visit the access point and request the pending transmissions and/or beacon updates from the access point (e.g., communications 142 between access point 112 and wireless station 106b). Note that in some embodiments, the period to visit may be scheduled to be aligned (or approximately/substantially aligned) and/or compatible with the proxy client's NAN datapath schedules.

FIG. 5B illustrates example schedules for infra BSS communications on an infra BSS channel(s), proxy device 106a, peer device 106b, and peer device 106c, according to embodiments. As illustrated, proxy device 106a may have a schedule that includes NAN discovery windows (e.g., time blocks 522) and NAN data cluster windows (e.g., time blocks 524) on NAN social channels as well as NAN data communications (e.g., time blocks 526) on NAN data channels and infra BSS communications (e.g., time blocks 520) on an infra BSS channel(s). Further, peer device 106b may have a schedule that includes NAN discovery windows (e.g., time blocks 522) and NAN data cluster windows (e.g., time blocks 524) on NAN social channels as well as NAN data communications (e.g., time blocks 526) on NAN data channels and infra BSS communications (e.g., time blocks 520). In addition, peer device 106c may have a schedule that includes NAN discovery windows (e.g., time blocks 522) and NAN data cluster windows (e.g., time blocks 524) on NAN social channels as well as NAN data communications (e.g., time blocks 526) on NAN data channels.

As illustrated, an access point (e.g., AP 112) may periodically transmit beacons (e.g., signals 530) and proxy device 106a may be scheduled to monitor the infra BSS channels and may receive a beacon 542. In addition, proxy device 106a may also be scheduled to be present for NAN discovery windows and NAN data cluster windows. Further, beacon 542 may include an indication that the access point has data and/or messages for peer device 106b. Thus, proxy device 106b may also be scheduled to visit NAN data channels to notify peer device 106b of the pending data/message from the access point, e.g., via message 544. Further, peer device 106b, may then visit the BSS infra channel to receive the data/message from the access point, e.g., via message 142. Note that peer device 106c may not visit the BSS infra channel, but may be scheduled for NAN data cluster windows and NAN discovery windows as illustrated.

In some embodiments, a device (e.g., wireless station 106a) capable of functioning as a proxy server for an access point may include proxy capabilities in NAN beacons and/or service discovery messages. In addition, a peer device receiving the proxy capabilities from the device, may determine (or chose) to use the proxy service from the device (e.g., the proxy server) if the peer device is within range of both the device and the access point for which the device is serving as proxy and if the peer device successfully associates with the access point and obtains an access identifier (AID) from the access point.

In some embodiments, the device may serve as a proxy, unregistered or registered. If the device serves as an unregistered proxy, the device (or proxy server) may define periodic proxy window(s) and may further announce (or advertise) the proxy window(s) together with (or included with) its proxy capabilities. In some embodiments, the proxy window(s) may align with a cluster time slot(s) and may reuse common rendezvous windows such as a data cluster base schedule time slot. Further, the proxy server may periodically check beacons from the access point and may record pending traffic indications and/or beacon update values from beacons received from the access point. In some embodiments, the proxy server may broadcast the recorded pending traffic indications and/or beacon update values during the announced proxy windows. Note that peer devices that decide (or choose) to use the proxy server may be present (listening or available) during the proxy window (s) and may collect (or receive) the pending traffic indications and/or beacon update values relayed by the proxy server. In addition, if a peer device determines (or finds) that the access point has pending transmissions for the peer NAN device and/or has new beacon updates, the peer device may schedule a period to visit (or communicate with) the access point and may obtain (or request the sending of) the pending transmissions and/or beacon updates from the access point.

In some embodiments, if the device serves as a registered proxy, the device (or proxy server) may request that a peer device that determines (or chooses) to use proxy service from the proxy server registers its AID with the proxy server to use the proxy service. Note that the proxy server may start the proxy service if there is at least one registered peer device (e.g., proxy client). Similar to an unregistered proxy, a registered proxy may periodically check beacons from the access point and may record pending traffic indications and/or beacon update values from beacons received from the access point. Additionally, based on the pending traffic indications and the proxy client's AID, the proxy server may determine whether the proxy client (or any additional proxy client registered to use the proxy service) has pending transmissions or data from the access point. Further, if the proxy server determines that a proxy client has pending transmissions and/or data from the access point, the proxy server may be present (or available) during a proxy client's further availability window (or time slot) and may actively relay (or push) the pending transmission notification and/or beacon update notifications to the proxy client.

In some embodiments, a proxy server may enable both unregistered proxy and registered proxy operations. In addition, in some embodiments, a proxy server may transmit a message (e.g., a keep-alive message) periodically to proxy clients to determine whether proxy service should be continued for a proxy client. Thus, if a proxy client stops receiving the message from the proxy server, the proxy client may start to check beacons from the access point without assistance of the proxy server.

In some embodiments, in order to aid proxy clients not to trace access point beacons and/or broadcast/multicast transmissions, the proxy server may cache beacons from the access point when the proxy server determines that there may be critical updates (or potentially critical updates) in the beacons from the access point. In such embodiments, the proxy server may relay (or push) the beacons (including the critical or potentially critical updates) to proxy clients during proxy windows (for unregistered proxy clients) and/or during further availability slots (for registered proxy clients). In some embodiments, a proxy server may also cache the broadcast/multicast frames from the access point and then relay (or push) the broadcast/multicast frames to proxy clients during proxy windows (for unregistered proxy clients) and/or during further availability slots (for registered proxy clients). Note that two or more adjacent devices that are associated with a common (or same) access point may serve as each other's proxy server alternately and/or on-demand, e.g., based on potential conflicts between their schedules and access point visiting schedules.

Figure 6:
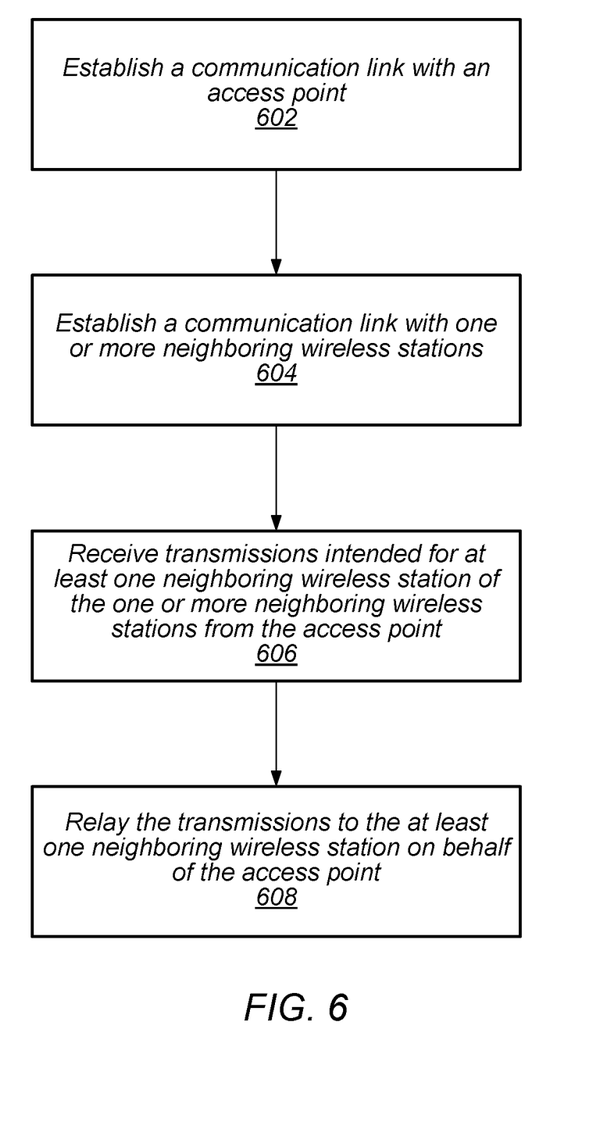
FIG. 6 illustrates a block diagram of an example of a method for relaying messages between an access point and a neighboring peer station, according to some embodiments.

FIG. 6 illustrates a block diagram of an example of a method for relaying messages between an access point and a neighboring peer station, according to some embodiments. The method shown in FIG. 6 may be used in conjunction with any of the systems or stations shown in the above Figures, among other stations. In various embodiments, some of the method elements shown may be performed concurrently, in a different order than shown, or may be omitted. Additional method elements may also be performed as desired. As shown, this method may operate as follows.

At 602, a communication link may be established with an access point (e.g., AP 112). The access point may be a Wi-Fi access point and may be configured to communication on an infra BSS channel. In some embodiments, the access point may be configured to periodically transmit beacons indicating data is available for one or more wireless stations associated with the access point.

At 604, a communication link with one or more neighboring wireless stations may be established, e.g., via negotiation. The communication link may be a peer-to-peer communication link, e.g., a direct communication link between wireless stations without utilizing an intermediate access point. In some embodiments, the communication link may be established according to the NAN protocol.

At 606, transmissions intended for at least one neighboring wireless station of the one or more neighboring wireless stations may be received from the access point. The transmission may be an indication that the access point has data or further messages for the at least one neighboring wireless station. In some embodiments, the transmissions may include beacons.

At 608, the transmissions may be relayed (transmitted) to the at least one neighboring station on behalf of the access point. In some embodiments, the transmissions may be relayed (transmitted) based on a schedule of proxy windows. In some embodiments, the transmissions may be relayed (transmitted) based on a further availability schedule of the at least one neighboring wireless station.

In some embodiments, whether the transmissions are intended for the at least one neighboring wireless station may be determined based, at least in part, on pending traffic indications and/or beacon update values contained in the transmissions. In other words, the transmissions may be scanned (or checked) for pending traffic indications (TIM) and/or beacon update indications (e.g., via a check beacon field). The scanning may be performed periodically in some embodiments.

In some embodiments, proxy capabilities may be transmitted and/or broadcasted to the one or more neighboring wireless stations. In some embodiments, the proxy capabilities may be transmitted in beacons and/or service discovery messages. In some embodiments, the proxy capabilities may include a schedule of proxy windows. In some embodiments, the proxy windows may align with rendezvous windows scheduled for a cluster to which the at least one neighboring station is associated.

In some embodiments, the at least one neighboring wireless station may be required to register its access identifier (AID) obtained from the access point in order to receive relayed transmissions. In some embodiments, whether the transmissions are intended for the at least one neighboring wireless station may be determined based, at least in part, on the registered AID.

Figure 7:
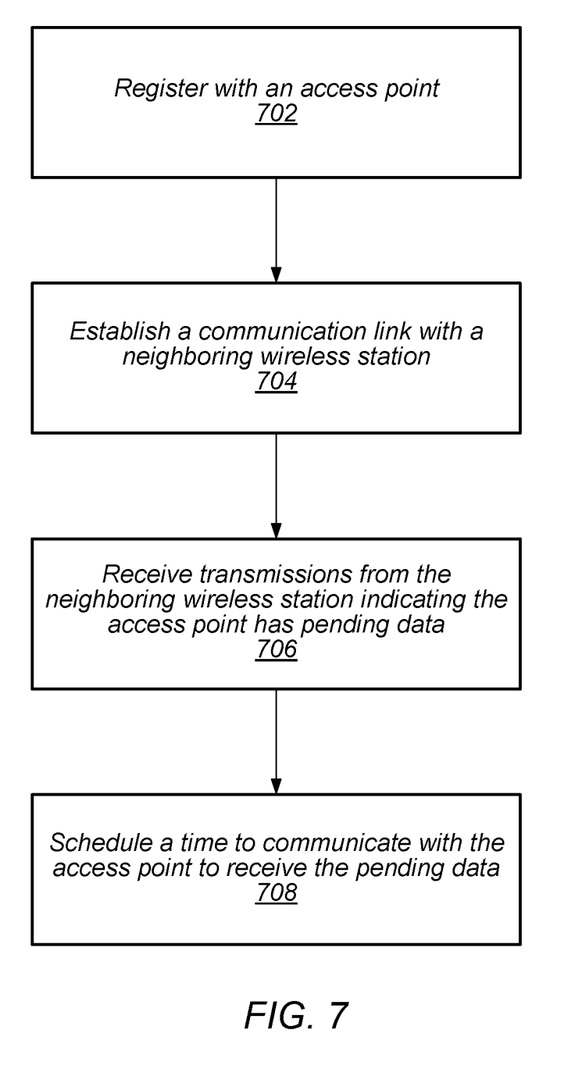
FIG. 7 illustrates a block diagram of an example of a method for receiving relayed messages from an access point via a proxy server, according to some embodiments.

FIG. 7 illustrates a block diagram of an example of a method for receiving relayed messages from an access point via a proxy server, according to some embodiments. The method shown in FIG. 7 may be used in conjunction with any of the systems or stations shown in the above Figures, among other stations. In various embodiments, some of the method elements shown may be performed concurrently, in a different order than shown, or may be omitted. Additional method elements may also be performed as desired. As shown, this method may operate as follows.

At 702, a wireless station (e.g., wireless station 106) may register with an access point (e.g., AP 112), e.g., the wireless station may obtain an access identifier from the access point. The access point may be a Wi-Fi access point and may be configured to communication on an infra BSS channel. In some embodiments, the access point may be configured to periodically transmit beacons indicating data is available for one or more wireless stations associated with the access point.

At 704, a communication link with a neighboring wireless station may be established, e.g., via negotiation. The communication link may be a peer-to-peer communication link, e.g., a direct communication link between wireless stations without utilizing an intermediate access point. In some embodiments, the communication link may be established according to the NAN protocol.

At 706, transmissions may be received from the neighboring wireless station indicating that the access point has pending data for the wireless station. In some embodiments, the transmissions may include beacons. In some embodiments, the transmissions may be received based on a schedule of proxy windows. In some embodiments, the transmissions may be received based on a further availability schedule of the wireless station.

At 708, a time to communicate with the access point to the pending data may be scheduled. In other words, a period (or time) to visit an infra BSS channel and request pending data from the access point may be scheduled. In addition, in some embodiments, the period to visit may be scheduled to be aligned (or approximately/substantially aligned) with other peer-to-peer communication link schedules maintained by the wireless station. In some embodiments, the peer-to-peer communication links may be NAN datapaths.

In some embodiments, whether the transmissions are intended for the at least one neighboring wireless station may be determined based, at least in part, on pending traffic indications and/or beacon update values contained in the transmissions. In other words, the transmissions may be scanned (or checked) for pending traffic indications (TIM) and/or beacon update indications (e.g., via a check beacon field). The scanning may be performed periodically in some embodiments.

In some embodiments, proxy capabilities may be received (e.g., via a unicast and/or broadcast transmission) by the wireless station. In some embodiments, the proxy capabilities may be received in beacons and/or service discovery messages. In some embodiments, the proxy capabilities may include a schedule of proxy windows. In some embodiments, the proxy windows may align with rendezvous windows scheduled for a cluster to which the wireless station is associated.

In some embodiments, the wireless station may be required to register its access identifier (AID) obtained from the access point with the neighboring wireless station in order to receive relayed transmissions.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio configured to perform Wi-Fi communication with a Wi-Fi access point;
at least one processor coupled to the at least one radio, wherein the wireless station is configured to perform voice and/or data communications;
wherein the wireless station is configured to:
establish a communication link between the wireless station and the Wi-Fi access point;
establish a peer-to-peer communication link between the wireless station and one or more neighboring wireless stations;
receive transmissions intended for at least one neighboring wireless station of the one or more neighboring wireless stations from the Wi-Fi access point, wherein the transmissions indicate that the Wi-Fi access point has pending traffic for the at least one neighboring wireless station; and
relay the transmissions to the at least one wireless station on behalf of the Wi-Fi access point, including:
in a first mode of operation, broadcasting received transmissions during one or more proxy windows scheduled by the wireless station, wherein a schedule of proxy windows aligns with a schedule of rendezvous windows scheduled for a cluster of devices to which the at least one neighboring station is associated; and
in a second mode of operation, transmitting, to the at least one neighboring wireless station, a received transmission intended for the at least one neighboring wireless station during a further availability timeslot specified by the at least one neighboring wireless station.

2. The wireless station of claim 1,
wherein the transmissions comprise beacons.

3. The wireless station of claim 1,
wherein the wireless station is further configured to:
transmit or broadcast proxy capabilities to the one or more neighboring wireless stations.

4. The wireless station of claim 3,
wherein to transmit or broadcast the proxy capabilities, the wireless station is further configured to:
transmit beacons and/or service discovery messages.

5. The wireless station of claim 3,
wherein the proxy capabilities include a schedule of proxy windows.

6. The wireless station of claim 1,
wherein to determine that the received transmission is intended for the at least one neighboring wireless station, the wireless station is further configured to compare an access identifier (AID) of the at least one neighboring wireless station with an AID included in the received transmission, wherein the AID of the at least one neighboring wireless station is received during a proxy registration process performed between the wireless station and the neighboring wireless station.

7. The wireless station of claim 6,
wherein, to perform the proxy registration process, the wireless station is further configured to:
receive, from the at least one neighboring wireless station, a request to serve as a registered proxy;
request, to the at least one neighboring wireless station, that the at least one neighboring wireless station associate with the access point and obtain the AID; and
receive, from the at least one neighboring wireless station, the AID.

8. The wireless station of claim 7,
wherein the wireless station is further configured to:
transmit, to the at least one neighboring wireless station, a request for the at least one neighboring wireless station to serve as a registered proxy for the wireless station; and
receive, from the at least one neighboring wireless station, a transmission intended for the wireless station received by the at least one neighboring wireless station on behalf of the wireless station, wherein the transmission is received during a further availability timeslot of the wireless station.

9. The wireless station of claim 1,
wherein the peer-to-peer communication link is established based on the Neighbor Awareness Networking (NAN) protocol.

10. An apparatus, comprising:
a memory; and
at least one processor in communication with the memory;
wherein the at least one processor is configured to:
    generate instructions to register with a Wi-Fi access point;
    establish a peer-to-peer communication link with a neighboring wireless station, including a schedule of proxy windows;
    receive, in a first mode of operation, transmissions from the neighboring wireless station indicating that the Wi-Fi access point has pending data and/or beacons intended for the wireless station during one or more proxy windows scheduled by the neighboring wireless station, wherein the schedule of proxy windows aligns with a schedule of rendezvous windows scheduled for a cluster of devices to which the apparatus is associated;
    receive, in a second mode of operation, transmissions from the neighboring wireless station indicating that the Wi-Fi access point has pending data and/or beacons intended for the wireless station during a further availability timeslot specified by the apparatus; and
    schedule, based on a further availability schedule associated with the apparatus, a time to communicate with the Wi-Fi access point to receive the pending data and/or beacons.

11. The apparatus of claim 10,
wherein the at least one processor is further configured to:
    receive proxy capabilities from the neighboring wireless station, wherein the proxy capabilities include the schedule of proxy windows.

12. The apparatus of claim 11,
wherein the proxy capabilities are received via beacons and/or service discovery messages.

13. The apparatus of claim 10,
wherein the at least one processor is further configured to:
    generate instructions to transmit, to the neighboring wireless station, a request for the neighboring wireless station to serve as a registered proxy for apparatus.

14. The apparatus of claim 10,
wherein the peer-to-peer communication link is established based on the Neighbor Awareness Networking (NAN) protocol.

15. A non-transitory computer readable memory medium storing program instructions executable by a processor of a wireless device to:
    establish a communication link between the wireless device and a Wi-Fi access point;
    establish a peer-to-peer communication link between the wireless device and one or more neighboring wireless stations, including a schedule of proxy windows, wherein the peer-to-peer communication link is established based on the Neighbor Awareness Networking (NAN) protocol;
    receive an indication from the Wi-Fi access point that the Wi-Fi access point has pending data for at least one neighboring wireless station of the one or more neighboring wireless stations; and
    generate instruction to relay the pending data to the at least one wireless station on behalf of the Wi-Fi access point, including:
        in a first mode of operation, broadcasting received pending data during one or more proxy windows scheduled by the wireless station, wherein the schedule of proxy windows aligns with a schedule of rendezvous windows scheduled for a cluster of devices to which the at least one neighboring station is associated; and
        in a second mode of operation, transmitting, to the at least one neighboring wireless station, a received pending data intended for the at least one neighboring wireless station during a further availability timeslot specified by the at least one neighboring wireless station.

16. The non-transitory computer readable memory medium of claim 15,
wherein to generate instructions transmit the indication, the program instructions are further executable to generate instructions to transmit beacons comprising the indication.

17. The non-transitory computer readable memory medium of claim 15,
wherein the program instructions are further executable to:
    determine that the pending data is intended for the at least one neighboring wireless station based at least in part on pending traffic indications and/or beacon update values contained in the indication.

18. The non-transitory computer readable memory medium of claim 15,
wherein the program instructions are further executable to:
    transmit or broadcast proxy capabilities to the one or more neighboring wireless stations.

19. The non-transitory computer readable memory medium of claim 18,
wherein to transmit or broadcast the proxy capabilities, the program instructions are further executable to:
    transmit beacons and/or service discovery messages.

20. The non-transitory computer readable memory medium of claim 15,
wherein the program instructions are further executable to:
    receive, from a first neighboring wireless station of the one or more wireless station, a request to serve as a registered proxy for the first neighboring wireless station;
    generate instructions to request, to the first neighboring wireless station, that the first neighboring wireless station associate with the access point and obtain an access identifier (AID);
    receive, from the first neighboring wireless station, the AID;
    receive, from the Wi-Fi access point, an indication of pending data for the first neighboring wireless station, wherein the indication includes the AID of the first neighboring wireless station; and
    transmit, to first neighboring wireless station, the pending data intended for the first neighboring wireless station during a further availability timeslot specified by the first neighboring wireless station.

* * * * *